A. Hebbard,

Car Spring.

No. 4,335. Reissued Apr. 11, 1871.

Witnesses.
Chas. M. Carthy
H. K. Fordrich

Inventor.
Albert Hebbard

UNITED STATES PATENT OFFICE.

ALBERT HEBBARD AND JOHN P. ONDERDONK, OF BUFFALO, NEW YORK, ASSIGNEES OF ALBERT HEBBARD.

IMPROVEMENT IN CAR-SPRINGS.

Specification forming part of Letters Patent No. 53,222, dated March 13, 1866; Reissue No. 4,335, dated April 11, 1871.

*To all whom it may concern:*

Be it known that ALBERT HEBBARD, of the city of Buffalo, county of Erie, and State of New York, invented a new and Improved Spiral Nest-Spring for Railroad-Cars and for other purposes; and the following is hereby declared to be a full and exact description thereof, reference being had to the accompanying drawings, making a part of this specification, in which—

Figure 1:
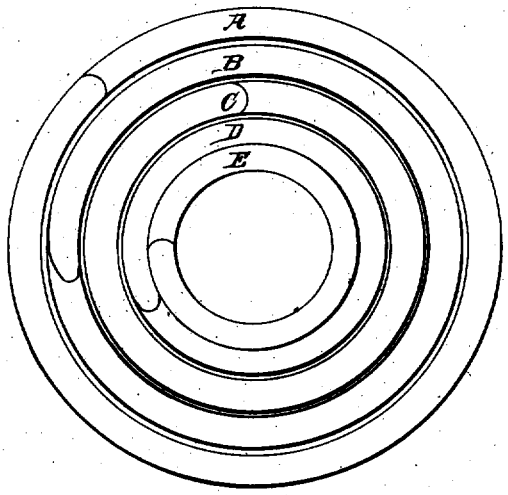
Figure 2:
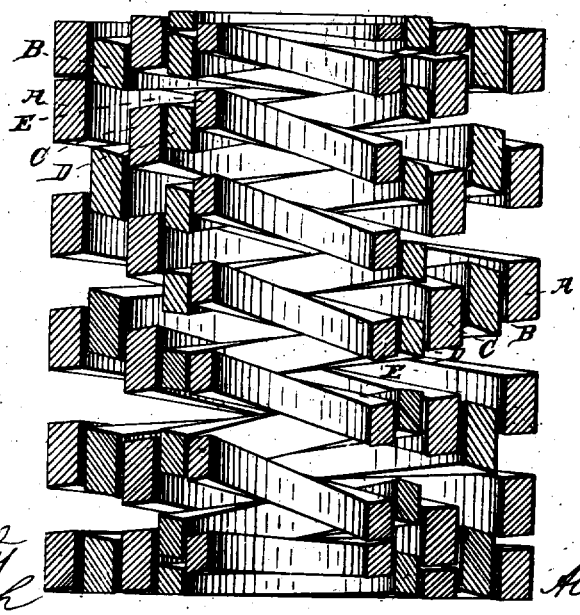

Figure 1 is a plan view of a spring made in accordance with this invention; Fig. 2, a vertical central section of the same.

This invention relates to a spiral nest-spring for railroad-cars and other purposes—that is to say, a spring composed of several separate spiral springs arranged one within the other in nest, each spring being distinct from the others, but the whole acting together, when occasion requires, as one spring.

The object of the invention is to produce a spring of this kind which shall be self-supporting, needing no accessory devices—such as central spindles or outside casings—to maintain it in a working position, and which may be used in a similar manner to and without more trouble or expense than a solid rubber spring or bumper.

The nature of the invention and the manner in which the same is or may be carried into effect will be fully understood by reference to the accompanying drawings.

A represents a spiral spring of any given diameter, length, and strength of metal, constructed according to any well-known method of making spiral springs.

B is a spiral spring similar in construction to A, and of such diameter that when placed within A the outer surface of its coils will be in close contact, or nearly so, with the inner surface of the coils of A. C, D, and E are similar springs arranged concentrically within B, as shown in the drawings, their diameters bearing such a relation to each other that the outer surface of each spring shall be in close contact, or nearly so, with the inner surface of the adjacent surrounding spring, as before described. Two or more of these coils, arranged together as described, form a nest-spring of great strength and durability, and of sufficient elasticity. In making this nest-spring it is preferred to coil the different springs alternately to the right and left, so that when placed in nest, the first or outside spring being coiled to the right, the second or next inside will be coiled to the left, and so on. This assists one spring to support the other and secures a more perfect action, the space between the layers of the one being crossed by the solid metal of the other. The several coils which compose the spring may, however, be coiled in the same direction, the adjacent coils being always in close contact, as above described, or nearly so.

In the operation of this spring the continual vibration—which is not only annoying to passengers, but also destructive to the springs—is counteracted by the friction arising from the close contact between the outer and inner surfaces of the adjacent coils. Another important effect of this arrangement of concentric coils is that the spring is entirely self-supporting—*i. e.*, it requires no casing or lateral support of any kind, either within or without, to prevent it from lateral serging or vibration, but the mutual support afforded by the coils is sufficient to preserve the axis of the spring from deflection. It has also been contemplated to make a slight difference in the length or height of the several coils constituting the nest, so as to adapt the nest to a light or heavy load. For instance, the two outer coils being of a given length, the third is a little shorter, and the fourth a trifle shorter than the third, and so on, so that with a light load the two outer springs would sustain the weight. The load being increased, the first, second, and third coils would mutually act, and with a still heavier load the fourth would also act, and so on.

It will of course be understood that the spiral nest-springs will vary in size, strength, and elasticity, according to the place and purpose for which they are to be used. They are believed to be much superior to rubber springs or metallic springs of any other construction heretofore in use for railroad-cars, and for all places where springs of great strength and durability are required. In case one coil should prove defective or should break, it can be easily replaced by another, so that the breaking of one does not impair the usefulness of the others, and the nest can be kept good at all times.

This spring is cheaper in construction and more perfect in action than any other kind of kind of metallic spring for railroad-car trucks, and can be packed and shipped for transportation with great ease and without danger of the parts being separated or disturbed.

What is claimed as the invention of the said ALBERT HEBBARD is—

1. A spiral nest-spring composed of two or more coils, the adjacent coils being in contact, or nearly so, and wound in opposite directions, so as to make the spring self-supporting.

2. A self-supporting spiral nest-spring composed of two or more concentric coils without lateral support.

In witness whereof we have hereunto affixed our hands, this 22d day of January, 1870, before two subscribing witnesses.

ALBERT HEBBARD.

Witnesses: JNO. P. ONDERDONK.

SAML. JENNISON,

T. J. CALHOUN,

E. IRVIN SCOTT,

T. SEYMOUR SCOTT.